United States Patent [19]

Nielsen et al.

[11] 4,140,736
[45] Feb. 20, 1979

[54] METHOD AND SYSTEM FOR MIXING A CONTINUOUSLY FLOWING MASS WITH A GAS

[75] Inventors: Erik Nielsen; Ole G. Krener, both of Hojbjerg; Soren N. Poulsen, Harlev J., all of Denmark

[73] Assignee: O. G. Hoyer A/S, Aarhus-Hojbjerg, Denmark

[21] Appl. No.: 654,393

[22] Filed: Feb. 2, 1976

[30] Foreign Application Priority Data

Feb. 10, 1975 [DK] Denmark .................. 484/75

[51] Int. Cl.² .............................................. B01F 3/04
[52] U.S. Cl. .......................................... 261/30; 62/69; 62/306; 261/140 R; 261/DIG. 16; 426/67; 426/474
[58] Field of Search .................. 261/30, 76, DIG. 16, 261/DIG. 26, DIG. 7, 140 R; 426/474, 477, 66, 67; 99/275, 323.1, 323.2; 62/66, 68–70, 306, 314

[56] References Cited

U.S. PATENT DOCUMENTS

| | | | |
|---|---|---|---|
| 2,774,578 | 12/1956 | Spiess, Jr. et al. | 261/DIG. 16 |
| 2,855,307 | 10/1958 | Konig | 426/477 |
| 3,211,331 | 10/1965 | Marisic et al. | 261/DIG. 7 |
| 3,256,100 | 6/1966 | Bernstein et al. | 426/474 X |
| 3,313,093 | 4/1967 | Guggenberger et al. | 261/DIG. 7 |
| 3,402,562 | 9/1968 | Menzel | 261/140 R X |
| 3,470,706 | 10/1969 | Mitchell et al. | 261/DIG. 7 |
| 3,723,340 | 3/1973 | Shepherd | 261/DIG. 26 |
| 3,726,102 | 4/1973 | Parks | 261/DIG. 7 |
| 3,765,318 | 10/1973 | Mazza | 261/DIG. 7 |

*Primary Examiner*—Richard L. Chiesa
*Attorney, Agent, or Firm*—Cyrus S. Hapgood

[57] ABSTRACT

To mix a gas with a mass flowing continuously through a conduit, the gas is caused to flow from a pressurized gas supply into the conduit by way of a nozzle in which the gas expands at a critical pressure ratio; and the pressure of the gas flowing from the nozzle is increased before the gas is introduced into the flowing mass.

4 Claims, 1 Drawing Figure

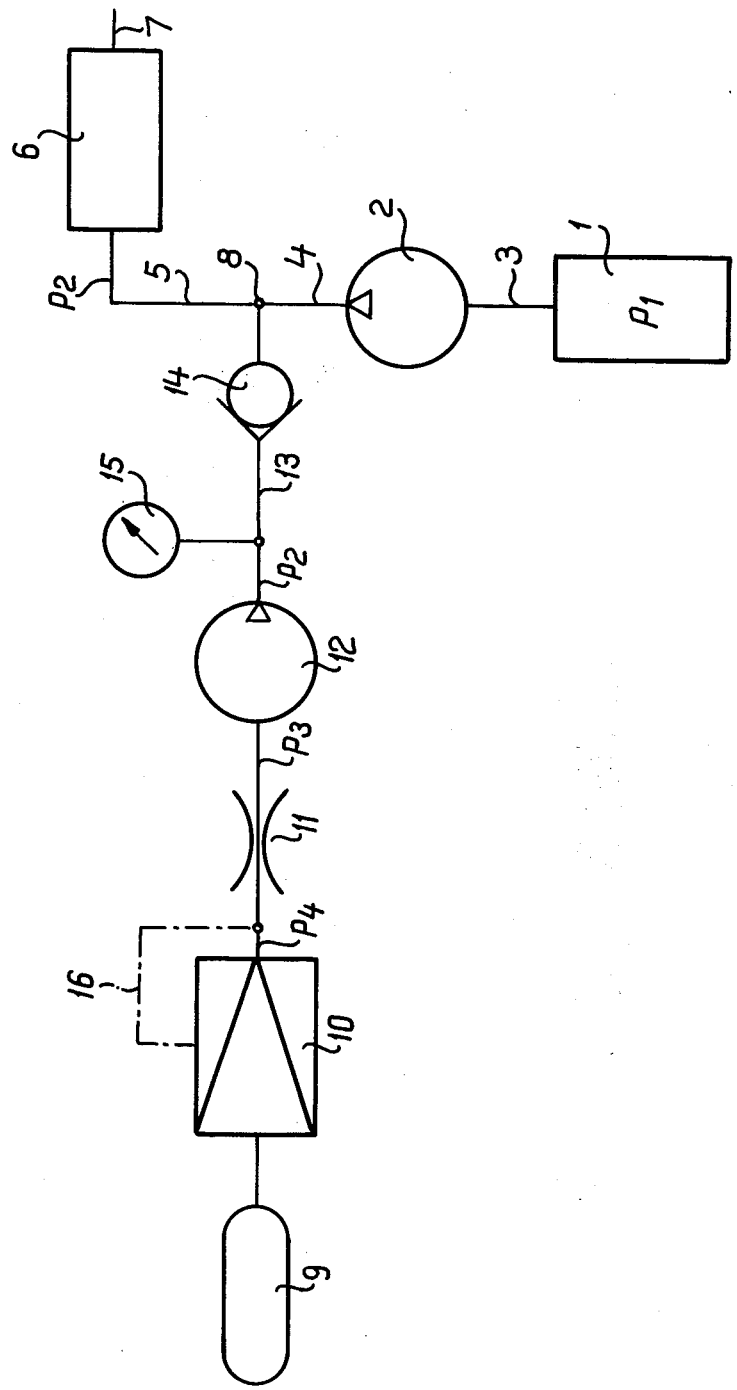

METHOD AND SYSTEM FOR MIXING A CONTINUOUSLY FLOWING MASS WITH A GAS

The present invention relates to a method of mixing a mass in liquid, cream or paste form, flowing continuously through a conduit, with a gas flowing from a pressurized gas supply into the conduit through a nozzle in which the gas expands at a critical pressure ratio and through a non-return valve.

Such a method is used, for example, in producing ice cream, in which case air is added to a liquid starting material of a more or less viscous or firm consistency, after which the air-containing product is frozen and pumped through a conduit, generally at a certain overpressure, to a filling station where it is filled into containers. The rate of relative air content, which in the production of ice cream is referred to as the swelling rate, is important for the price as well as the quality of the final product. Legislation often prescribes a maximum value for the air content in products of the type referred to, and it is then of interest to the producer that the air content be kept as close as possible below the allowed value.

It is known to control the air addition by letting the air flow through a nozzle at a critical pressure ratio, which has the advantage that the air flow rate through a given nozzle is dependent only on the pressure and temperature at the upstream side of the nozzle and can therefore be controlled in a simple way and with great accuracy, and at the same time the flow rate of the liquid component of the mixture can be easily controlled by using a volumetric pump for transporting the mass.

As is known, a gas flows through a nozzle at a critical pressure ratio when the ratio between the absolute pressures of the gas after and before the nozzle, respectively, is less than or equal to a value $\epsilon_{cr}$ which is dependent upon the ratio $k$ between the values of specific heat of the gas at constant pressure and constant volume. With this presumption, the flow rate is proportional to the pressure before the nozzle and the constant cross-sectional area of the nozzle, and inversely proportional to the square root of the gas temperature before the nozzle. Since the last mentioned factor in practice may be considered as a constant, it is possible as indicated above, to control the flow rate by merely controlling the inlet pressure of the nozzle.

The critical pressure ratio $\epsilon_{cr}$ of atmospheric air is 0.528, and thus the pressure on the inlet side of the nozzle must be about twice as high as the pressure in the conduit through which the liquid material flows. When ice cream is produced, wherein the mixture is added to the air on the inlet side of the freezer, the last mentioned pressure is rather high, often around 0.5 Mpa (70 psi) absolute pressure; and it is then necessary that the pressure in the air supply be at least around 1.0 Mpa (140 psi) absolute pressure, which is above the values normally utilized in central air compressing plants. In addition, the high pressure entails a correspondingly small cross-sectional area in the nozzle, which in practice makes the nozzle very susceptible to clogging.

Attempts have been made to remove the above-mentioned drawbacks by providing two volumetric pumps in series in the conduit conveying the liquid material, the air nozzle being connected between the two pumps. When the last pump as seen in the flow direction has sufficient capacity, the pressure at the place where the air is added can be kept essentially lower than the counter-pressure of the freezer, and it is thus possible to operate at a more normal pressure in the air supply and with a correspondingly larger nozzle area. This method has serious drawbacks, however, which make its advantages doubtful. For conveying the liquid mass, two pumps are required instead of one; and when preparing edible products such as ice cream, the pumps must be made of expensive materials for hygienic reasons, and they must be cleaned at short intervals. The production equipment normally comprises a manometer for indicating the pressure at the inlet of the freezer; and because of the extra pump, this manometer must be connected at the downstream side of the pump, and thus the same materials and cleaning problems occur with the manometer as with the pump. Furthermore, the first one of the two pumps might operate under such conditions that its inlet pressure is higher than the counter-pressure in the conduit between the two pumps. If the pump is worn or improperly adjusted, the output thereof will then be increased, which might cause an undesirable increase of pressure in the freezer.

With the object of rectifying the above-noted drawbacks, the method according to the invention is characterized in that the pressure of the gas flowing from the nozzle is increased before the gas is introduced into the flowing mass.

As a consequence of this increase of pressure in the gas flowing from the nozzle, the latter will operate at pressures correspondingly lower than the pressure in the liquid mass, and therefore it is no problem to maintain a suitable pressure in the gas supply and a suitably large cross-sectional flow area in the nozzle. In the liquid mass conduit, only one pump is required, and this pump operates directly against the relatively high pressure at the outlet end of the conduit, and thus its capacity can easily be controlled. The pump used for obtaining the increase of pressure in the gas will not come in contact with the liquid mass, and therefore no particular demands are raised as to the design and maintenance of this pump. The same applies to a manometer or a corresponding metering means for recording the pressure on the downstream side of the nozzle.

The invention also relates to a system for practising the method and comprising a main conduit for throughflow of a mass in liquid, cream or paste form, and a branch conduit connected to the main conduit, the branch conduit being adapted for connection to a supply of pressurized gas and including a nozzle. The system is characterized in that an air pump is inserted in the branch conduit between the nozzle and the main conduit, the suction side of the air pump being connected to the nozzle and the pressure side thereof being connected to the main conduit, preferably through a non-return valve.

The invention will be explained more in detail below with reference to the accompanying drawing in which the single illustration is a schematic view of an embodiment of a plant according to the invention for use in the production of ice cream.

A container 1 is adapted to contain liquid starting material, i.e., the mixture for production of the ice cream. This material is usually a mixture of water, fatty substance, sugar and milk dry substance. The material may flow through a conduit 3 to a volumetric pump 2 which, via its outlet conduit 4–5, conveys the material to a continuous ice cream freezer 6 of a known design. The outlet conduit of the freezer is designated 7. Before the material flows into the freezer 6, a certain amount of air is continuously added through a mixing means 8 which is not shown in detail and which is located at the junction of the two conduit sections 4 and 5. The air is delivered from a supply 9 such as a central air compressing plant supplying a plurality of freezers and other possible consumers in the production enterprise. The air flows from the supply 9 through a reductive valve 10 and a nozzle 11 to an air pump 12, the pressure side of which is connected to the mixing means 8 through a conduit 13 comprising a non-return valve 14. A manometer 15 is connected to the conduit 13 between the pump 12 and the non-return valve 14, and the drawing further illustrates in broken lines a control conduit 16 for controlling the outlet pressure of the valve 10.

The liquid pump 2 raises the pressure on the liquid mixture from the pressure $p_1$ prevailing in the container 1 to the essentially higher pressure $p_2$ prevailing in the inlet conduit 4–5 of the freezer 6. By analogy therewith, the air pump 12 raises the pressure $p_3$ on the outlet side of the nozzle 11 to the inlet pressure $p_2$ of the freezer. By means of the reduction valve 10, the pressure $p_4$ on the upstream side of the nozzle 11 is controlled in such a way that the maximum value of the ratio $p_3$ to $p_4$ for maintaining a constant flow rate through the nozzle is not exceeded. The non-return valve 14 ensures that the liquid mixture cannot flow into the conduit 13 and further to the pump 12 or the manometer 15. Since the flow resistance in the non-return valve 14 is negligible, the pressure in the conduit 13 is in practice equal to $p_2$, and thus the manometer shows the value of the pressure at the inlet of the freezer.

The pump 12 may be of any design suitable for a particular use, such as a piston pump or a rotary compressor, provided its design is such that there is no risk of inflowing of false air. When using the plant for the production of edible products, it will normally be suitable to insert an oil filter (not shown) between the pump 12 and the non-return valve 14.

We claim:

1. A mixing system comprising a main conduit for through-flow of a mass in liquid, cream or paste form, a source of pressurized gas, and a branch conduit connecting said source to the main conduit and including an expansion nozzle, the system being characterized in that an air pump is inserted in the branch conduit between the nozzle and the main conduit, the gas passing through said branch conduit being expanded in said expansion nozzle at a critical pressure ratio, the suction side of said air pump being connected to the nozzle, and the pressure side of the air pump being connected to the main conduit.

2. The system of claim 1, comprising also a non-return valve through which the pressure side of the air pump is connected to the main conduit.

3. A method of mixing a mass in liquid, cream or paste form with a gas, which comprises the steps of flowing said mass continuously through a conduit, flowing said gas from a pressurized gas supply into said conduit by way of an expansion nozzle, expanding the gas at a critical pressure ratio in said nozzle, and increasing the pressure of the gas flowing from the nozzle before the gas is introduced into the flowing mass.

4. The method of claim 3, wherein said pressure increase is effected by flowing the gas from said nozzle through a pumping zone and discharging the gas from said zone into said conduit at a pressure substantially higher than the pressure of the gas leaving the nozzle.

* * * * *